(12) United States Patent
Kawanishi et al.

(10) Patent No.: US 7,526,209 B2
(45) Date of Patent: *Apr. 28, 2009

(54) OPTICAL FREQUENCY SHIFT KEYING MODULATOR

(75) Inventors: Tetsuya Kawanishi, Koganei (JP); Masayuki Izutsu, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 523 days.

This patent is subject to a terminal disclaimer.

(21) Appl. No.: 10/960,761

(22) Filed: Oct. 8, 2004

(65) Prior Publication Data

US 2005/0111853 A1    May 26, 2005

(30) Foreign Application Priority Data

Oct. 10, 2003  (JP) .............................. 2003-352565

(51) Int. Cl.
*H04B 10/04* (2006.01)

(52) U.S. Cl. ........................ 398/187; 398/183; 398/141; 385/1; 385/3; 385/39; 385/40

(58) Field of Classification Search ................... 398/79, 398/182–192; 333/156; 356/477; 250/226
See application file for complete search history.

(56) References Cited

U.S. PATENT DOCUMENTS 5,594,577 A * 1/1997 Majima et al. ................. 398/79

(Continued)

FOREIGN PATENT DOCUMENTS

JP    05-091047 A    4/1993

(Continued)

OTHER PUBLICATIONS

Kawanishi et al: "Suppression of Optical Harmonics in Wavelength Conversion Using Optical Single-Sideband Modulator", OFC 2003, vol. 2, Mar. 23-28, 2003.*

(Continued)

*Primary Examiner*—Ken N Vanderpuye
*Assistant Examiner*—Li Liu
(74) *Attorney, Agent, or Firm*—Westerman, Hattori, Daniels & Adrian, LLP.

(57) ABSTRACT

An optical FSK modulator which can be used for an optical information communication is provided. The optical FSK is provided with: a second sub Mach-Zehnder waveguide ($MZ_B$) 3; a main Mach-Zehnder waveguide ($MZ_C$) 4 including the $MZ_A$ and $MZ_B$ and provided with a light input portion and a modulated light output portion; a first direct-current or low-frequency electrode ($DC_A$ electrode) 5 controlling a bias voltage between two arms composing the $MZ_A$, thereby controlling a phase of light propagating in the two arms of the $MZ_A$; a second direct-current or low-frequency electrode ($DC_B$ electrode) 6 controlling a bias voltage between two arms composing the $MZ_B$, thereby controlling a phase of light propagating in the two arms of the $MZ_B$; a first RF electrode ($RF_A$ electrode) 7 inputting a radio frequency (RF) signal to the two arms composing the $MZ_A$; a second RF electrode ($RF_B$ electrode) 8 inputting an RF signal to the two arms composing the $MZ_B$; and a traveling-wave-type electrode ($RF_C$ electrode) 11 controlling a voltage of the RF signal inputted, thereby controlling a frequency of light outputted from the output portion.

12 Claims, 6 Drawing Sheets

U.S. PATENT DOCUMENTS

| | | | |
|---|---|---|---|
| 5,835,212 A * | 11/1998 | Kissa et al. | 356/477 |
| 6,781,741 B2 * | 8/2004 | Uesaka | 359/279 |
| 2002/0130251 A1 * | 9/2002 | Myers et al. | 250/226 |
| 2002/0171900 A1 * | 11/2002 | Ono et al. | 359/181 |
| 2003/0102938 A1 * | 6/2003 | Erlig et al. | 333/156 |
| 2004/0037570 A1 * | 2/2004 | Wedding | 398/187 |
| 2004/0208436 A1 * | 10/2004 | Hakimi et al. | 385/27 |

FOREIGN PATENT DOCUMENTS

| | | |
|---|---|---|
| JP | 11-295674 A | 10/1999 |
| JP | 2002-268025 A | 9/2002 |

OTHER PUBLICATIONS

Krahenbuhl et al: "Investigations on Short-Path-Length High-Speed Optical Modulators in LiNbO3 With Resonant-Type Electrodes", Journal of Lightwave Technology, vol. 19, No. 9, Sep. 2001, p. 1287-1297.*

Shimotsu et al: "Wideband Frequency Conversion with LiNbO3 Optical Single-Sideband Modulator", OFC 2001, vol. 3, Mar. 17-22, 2001, p. WK3-1-WK3-4) and Majima et al (US 5,594,577.*

Zhang et al: "An Optical FSK Transmitter Based on an Integrated DFB Laser-EA Modulator and Its Application in Optical Labeling", IEEE Photonics Technology Letters, vol. 15, No. 7, Jul. 2003, p. 984-986.*

Ishibashi et al: "High Power Uni-Traveling-Carrier Photodiodes", Microwave Photonics, MWP'99, vol. 1, Nov. 11-19, 1999, p. 75-78.*

Shimotsu et al: "Single Side-Band Modulation Performance of a LiNbO3 Integrated Modulator Consisting of Four-Phase Modulator Waveguides", IEEE Photonics Technology Letters, vol. 13, No. 4, p. 364-366.*

Shimotsu et al: "Wideband Frequency Conversion with LiNbO3 Optical Single-Sideband Modulator", OFC 2001, vol. 3, Mar. 17-22, 2001, p. WK3-1-WK3-4.*

Office Action (Notice of Reasons for Rejection) issued in Japanese Appln. 2004-297901, dated Oct. 12, 2006 with Concise Explanation of Relevance.

Kawanishi, et al, Optical frequency shift by using optical SSB modulator, Technical Report of IEICE, vol. 103, No. 171, Jul. 2003, pp. 5-8, published in English.

Kawanishi et al., Analysis of Tunable Delay-Line Using an Optical Single-Sideband Modulator, IEICE Trans. Electron., vol. E86-C, No. 7, Jul. 2003, pp. 1230-1235, published in English.

Izutsu, et al., Integrated Optical SSB Modulator/Frequency Shifter, IEEE Journal of Quantum Electronics, vol. QE-17, No. 11, Nov. 1981, pp. 2225-2227, published in English.

Kawanishi, et al., Suppression of Optical Harmonics in Wavelength Conversion Using Optical Single-Sideband Modulator, OFC 2003, vol. 2, FP7, pp. 771-772, published in English.

Higuma, et al., X-cut lithium niobate optical single-sideband modulator, Electronics Letters, Apr. 12, 2001, vol. 37, No. 8, pp. 515-516, published in English.

Kawanishi, et al., High-Speed Optical Modulators and Photonic Sideband Management, Laser Review, vol. 30, No. 10, 2002, pp. 576-580.

* cited by examiner

*FIG. 5*
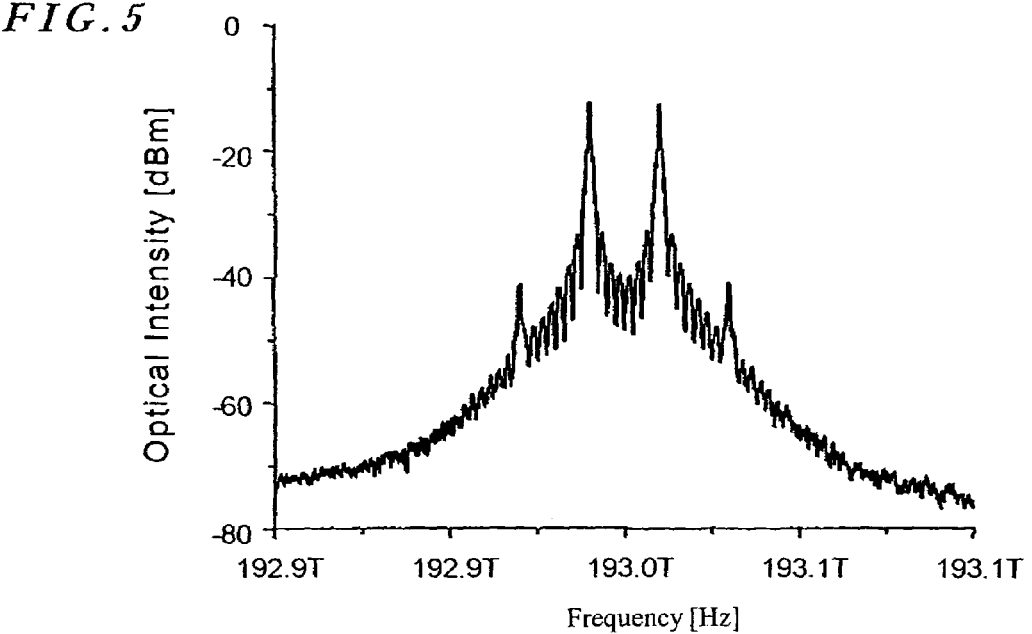
*FIG. 6*
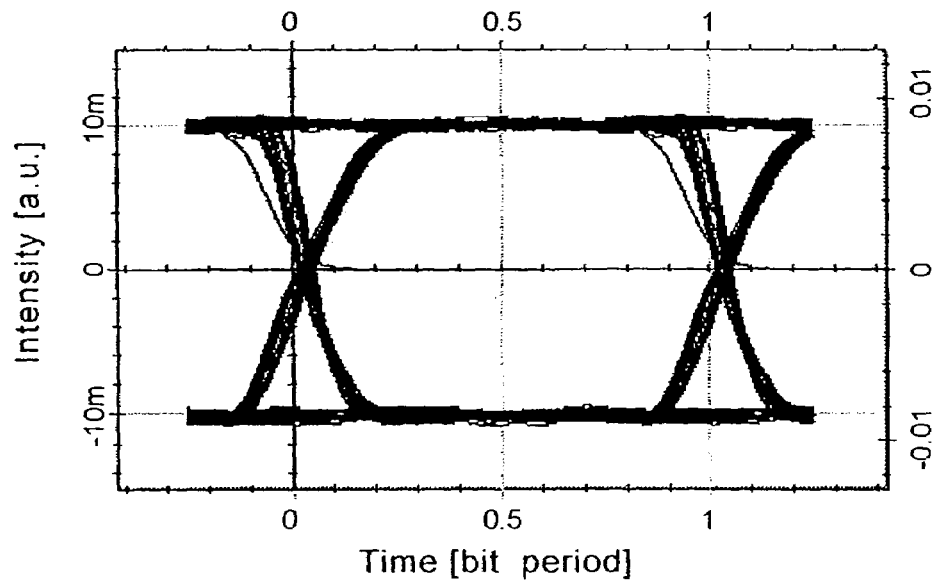
*FIG.7A*    *FIG.7B*    *FIG.7C*    *FIG.7D*    *FIG.7E*
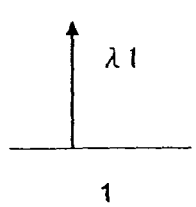 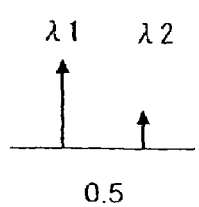 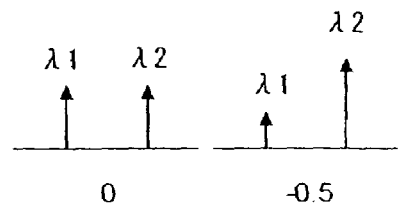 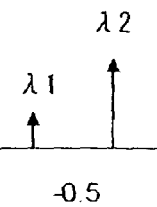 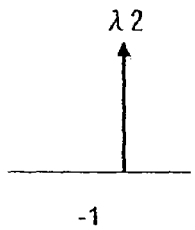

OPTICAL FREQUENCY SHIFT KEYING MODULATOR

BACKGROUND OF THE INVENTION

1. Field of the Invention

The present invention relates to an optical frequency shift keying modulator and the like.

2. Description of the Related Art

An optical frequency shift keying (optical FSK) is a technology which applies modulation to a frequency of light and transmits variations in the frequency as a signal. An FSK signal generally carries no information on its amplitude, so that it has a feature of being subject to a level fluctuation or noise.

An FSK system using a digital signal has been already known (see e.g. Japanese patent application laid-open No.11-17746). However, this technology is related to shifting the frequency of the digital signal, so that the frequency of light is not shifted.

As a system for shifting a frequency of light, there is an optical FSK system. In a conventional optical FSK system, a laser emission wavelength itself is changed by varying an electric current provided to a tunable laser light source. On a receiver's side, received laser light is separated into components per wavelength by a branching filter, converted into electric signals and intensities thereof are measured by a photodetector, and a difference thereof is obtained by a subtracter. However, in an optical FSK system of such a method, a laser intensity changes as the laser wavelength is changed, so that there is a problem that this must be compensated. Moreover, there is a problem that such a system cannot accommodate to a high-speed operation.

Also, as an apparatus capable of changing a frequency of inputted light, an optical single sideband modulator (optical SSB modulator) is known. FIG. 1 is a block diagram showing a basic arrangement of an optical SSB modulator. As shown in FIG. 1, an optical SSB modulator 1 is provided with: a first sub Mach-Zehnder waveguide ($MZ_A$) 2; a second sub Mach-Zehnder waveguide ($MZ_B$) 3; a main Mach-Zehnder waveguide ($MZ_C$) 4 including the $MZ_A$ and $MZ_B$; a first electrode ($DC_A$ electrode) 5 controlling a bias voltage between two arms composing the $MZ_A$, thereby controlling a phase of light propagating in the two arms of the $MZ_A$; a second electrode ($DC_B$ electrode) 6 controlling a bias voltage between two arms composing the $MZ_B$, thereby controlling a phase of light propagating in the two arms of the $MZ_B$; a first RF electrode ($RF_A$ electrode) 7 inputting a radio frequency (RF) signal to the two arms composing the $MZ_A$; a second RF electrode ($RF_B$ electrode) 8 inputting the RF signal to the two arms composing the $MZ_B$; and a direct-current or low-frequency electrode ($DC_C$ electrode) 9 controlling the bias voltages of the $MZ_A$ and $MZ_B$, thereby controlling a phase of light propagating in the $MZ_A$ and $MZ_B$. It is to be noted that "low frequency" in the low-frequency electrode denotes a frequency of e.g. 0 Hz-500 MHz.

Namely, in the optical SSB modulator, the direct-current or low-frequency electrode ($DC_C$ electrode) is used for controlling the phase of light propagating in the $MZ_A$ and $MZ_B$. It is to be noted that the optical SSB modulator is reported in detail in "Optical SSB modulator using integrated LN modulator" (Shimotsu et al., Technical Report of IEICE, OEIC. OPE2000-37, LQE2000-31(2000-07), 29-34, 2000).

Although a frequency of the output light can be changed by the optical SSB modulator, there is a limit to a response speed of a control circuit for changing the frequency, so that a speed of the frequency change by the optical SSB modulator has a limit of approximately 10 ns. Originally, the optical SSB modulator is not intended for shifting the frequency of the output light so as to use the shifted frequency as information. Therefore, there is a problem that the optical SSB modulator is not exactly suitable for an optical FSK modulator. Japanese patent application laid-open No.11-17746

SUMMARY OF THE INVENTION

An object of the present invention is to provide an optical FSK modulator which can be used for an optical information communication and the like.

An object of the present invention is to provide an optical FSK modulator which can be used for an optical information communication and the like, and which can transmit information at a high speed.

An object of the present invention is to provide an optical FSK modulator which can be used for an optical information communication and the like, and which is relatively space-saving.

An object of the present invention is to provide an optical FSK modulator which is used for an optical multiplex information communication including changes of an amplitude and frequency of an output light.

An object of the present invention is to provide an optical FSK modulator which can provide a new millimeter-wave source and microwave source.

An object of the present invention is to provide an optical communication method by an optical FSK.

An object of the present invention is to provide an optical FSK communication system that is an optical communication system by an optical FSK.

An object of the present invention is to provide a multivalued modulation optical FSK communication system.

An object of the present invention is to provide an optical FSK and optical intensity modulation communication system that is an optical communication system by an optical FSK and optical intensity modulation.

An object of the present invention is to provide a method of generating a millimeter-wave/microwave using an optical FSK modulator.

An object of the present invention is to provide a UWB wireless communication system using an optical FSK modulator.

(1) In order to achieve at least one of the above mentioned objects, an optical FSK modulator of the present invention is provided with: a first sub Mach-Zehnder waveguide ($MZ_A$); a second sub Mach-Zehnder waveguide ($MZ_B$); a main Mach-Zehnder waveguide ($MZ_C$) including the $MZ_A$ and $MZ_B$, and comprising a light input portion and a modulated light output portion; a first RF electrode ($RF_A$ electrode) inputting a radio frequency (RF) signal to two arms composing the $MZ_A$; a second RF electrode ($RF_B$ electrode) inputting the RF signal to two arms composing the $MZ_B$; and a third RF electrode ($RF_C$ electrode) of a traveling-wave-type electrode controlling a frequency of the inputted RF signal, thereby controlling a frequency of the light outputted from the output portion; so as to control the frequency of the RF signal inputted to the $RF_C$ electrode of the traveling-wave-type electrode corresponding to the RF signal, thereby modulating the voltage of the light outputted from the output portion is modulated.

The optical FSK modulator of the present invention performs frequency modulation, at a potion corresponding to the DCc electrode in the conventional optical SSB modulator, with the $RF_C$ electrode of the traveling-wave-type electrode, so that a frequency modulated signal can be outputted at a high speed (e.g. 0.2 ns). Accordingly, the optical FSK modulator of the present invention contributes to increasing the transmission rate. Also, unlike the conventional optical FSK modulator, the optical FSK modulator of the present invention does not change the wavelength of the light source, so that the power supplied to the light source can be maintained at a fixed value, thereby preventing generation of parasitic intensity variations. Thus, in an optical communication system using the optical FSK modulator of the present invention, an intensity modulator for compensating intensity variations becomes unnecessary, so that a simple and highly precise system can be achieved. Also, the optical FSK modulator of the present invention can make a wavelength shifting amount match with twice the frequency of the high-frequency electric source signal, so that the wavelength shifting amount is precise.

Moreover, the optical FSK modulator of the present invention can easily generate a UWB signal by making the $RF_C$ signal a rectangular pulse with short rise/fall times. Namely, according to the present invention, a new millimeter-wave source and microwave source can be provided.

(2) The optical FSK modulator of the present invention preferably uses a resonant-type electrode as the $RF_A$ electrode and the $RF_B$ electrode. Since the resonant-type electrode is used as the $RF_A$ electrode and the $RF_B$ electrode, the optical FSK modulator can be downsized and the efficiency thereof can be increased.

(3) The optical FSK modulator of the present invention is preferably provided with: a first direct-current or low-frequency electrode ($DC_A$ electrode) controlling a bias voltage between the two arms composing the $MZ_A$, thereby controlling a phase of light propagating in the two arms of the $MZ_A$; and a second direct-current or low-frequency electrode ($DC_B$ electrode) controlling a bias voltage between the two arms composing the $MZ_B$, thereby controlling a phase of light propagating in the two arms of the $MZ_B$. In this example, DC electrodes and RC electrodes are separately provided, so that a circuit for overlaying the DC electrode and the RF electrode on the outside of an MZ interferometer is unnecessary.

(4) The optical FSK modulator of the present invention is preferably provided with: a third direct-current or low-frequency electrode ($DC_C$ electrode) controlling a bias voltage between two arms composing the $MZ_C$, thereby controlling a phase of light propagating in the two arms of the $MZ_C$.

(5) In order to achieve at least one of the above mentioned objects, an optical information communication method of the present invention uses the above-mentioned optical FSK modulator and includes: a light leading step of leading light into the light input portion; an RF signal inputting step of inputting the RF signal to the $RF_A$ electrode and the $RF_B$ electrode; and an output light frequency shift keying step of controlling a voltage of the signal inputted to the $RF_C$ electrode, thereby controlling the frequency of the light outputted from the output portion.

In the present invention, the traveling-wave-type electrode is used for the $RF_C$ electrode, so that a frequency of the output light can be modulated at a high speed.

(6) It is preferable that in the optical information communication method of the present invention, the signal inputted to the $RF_C$ electrode has a frequency component equal to or greater than 500 MHz.

(7) It is preferable that in the optical information communication method of the present invention, an intensity of the RF signal inputted to at least one of the $RF_A$ electrode and the $RF_B$ electrode is controlled, so that an amplitude of the output light is modulated and the modulated amplitude is communicated as information.

By transmitting not only the variations of the frequency of light but also the variations of the amplitude of light, more information can be transmitted at once.

(8) In order to achieve at least one of the above mentioned objects, in an optical FSK communication system of the present invention that is an optical communication system including a transmitter, a receiver, and a fiber connecting the transmitter and the receiver; the transmitter is provided with a laser light source, an optical FSK modulator described in any one of the above-mentioned (1) through (4) to which claimed the light from the laser light source is inputted, a signal source outputting a signal to be transmitted to the optical FSK modulator, and a high-frequency electric signal source providing a high frequency electric signal to the optical frequency shift keying modulator; and the receiver is provided with a branching filter branching a light signal transmitted from the transmitter according to a wavelength thereof, a first photodetector detecting one of the light signal branched by the branching filter, a second photodetector detecting the remaining light signal branched by the branching filter, and a subtracter calculating a difference between output signals of the first and second photodetectors.

Unlike the conventional optical FSK communication system, the optical FSK communication system of the present invention does not change the wavelength of the light source, so that the power supplied to the light source can be maintained at a fixed value, thereby preventing generation of parasitic intensity variations. Thus, in the optical FSK communication system of the present invention, an intensity modulator for compensating intensity variations becomes unnecessary, so that a simple and highly precise system can be achieved.

(9) As another aspect of the present invention, the optical FSK communication system described in the above-mentioned (7) in which the signal source can set a plurality of voltage levels to be switched over can be mentioned. Such a communication system is called a multivalued modulation optical FSK communication system.

Since the multivalued modulation optical FSK communication system can obtain output signals having a plurality of output intensity levels, information of the output signals can be further increased.

(10) In order to achieve at least one of the above mentioned objects, in an optical FSK and optical intensity modulation communication system of the present invention that is an optical communication system including a transmitter, a receiver, and a fiber connecting the transmitter and the receiver; the transmitter is provided with a laser light source, an optical intensity modulator modulating intensity of light from the laser light source, an optical FSK modulator described in any one of the above-mentioned (1) through (4) to which the light from the laser light source having the intensity thereof modulated by the optical intensity modulator is inputted, an intensity modulating signal source outputting a signal to be transmitted to the optical intensity modulator, a signal source outputting a signal to be transmitted to the optical FSK modulator, and a high-frequency electric signal source providing a high frequency electric signal to the optical FSK modulator; and the receiver is provided with an intensity measurement photodetector measuring intensity of an optical signal transmitted from the transmitter, a branching filter branching a light signal transmitted from the transmitter according to a wavelength thereof, a first photodetector detecting one of the light signal branched by the branching filter, a second photodetector detecting the remaining light signal branched by the branching filter, and a subtracter calculating a difference between output signals of the first and second photodetectors.

The optical FSK and optical IM communication system of the present invention can modulate intensity of laser light prior to the optical FSK modulation, so as to transmit a signal to which the optical FSK and the optical intensity modulation is simultaneously applied.

(11) In another aspect of an optical FSK and optical intensity modulation communication system of the present invention that is an optical communication system including a transmitter, a receiver, and a fiber connecting the transmitter and the receiver; the transmitter is provided with a laser light source, an optical FSK modulator described in any one of the above-mentioned (1) through (4) to which light from the laser light source is inputted, an optical intensity modulator modulating intensity of the light from the laser light source having a frequency thereof modulated by the optical frequency shift keying modulator is inputted, an intensity modulating signal source outputting a signal to be transmitted to the optical intensity modulator, a signal source outputting a signal to be transmitted to the optical FSK modulator, and a high-frequency electric signal source providing a high frequency electric signal to the optical FSK modulator; and the receiver is provided with an intensity measurement photodetector measuring intensity of an optical signal transmitted from the transmitter, a branching filter branching a light signal transmitted from the transmitter according to a wavelength thereof, a first photodetector detecting one of the light signal branched by the branching filter, a second photodetector detecting the remaining light signal branched by the branching filter, and a subtracter calculating a difference between output signals of the first and second photodetectors.

Namely, in this aspect of the optical FSK and optical intensity modulation communication system, the optical intensity modulator modulates the light from the laser light source having the frequency thereof modulated by the optical FSK modulator.

(12) In order to achieve at least one of the above mentioned objects, a millimeter-wave/microwave pulse generation method of the present invention uses an optical FSK modulator described in any one of the above-mentioned (1) through (4) and a photodetector which can respond to a frequency component equal to or greater than twice the RF signal frequency inputted to the $RF_A$ electrode and the $RF_B$ electrode of the optical FSK modulator.

Namely, the millimeter-wave/microwave pulse generation method of the present invention uses the above-mentioned optical FSK modulator, and by using, for example, a high-frequency rectangular pulse having a rise time of 1%-10% as the signal applied to the $RF_C$ electrode, the millimeter-wave/microwave pulse is obtained. Also, since a photodetector which can respond to a frequency component equal to or greater than twice the RF signal frequency inputted to the $RF_A$ electrode and the $RF_B$ electrode of the optical FSK modulator is used, such a millimeter-wave/microwave can be effectively detected.

(13) In order to achieve at least one of the above mentioned objects, a UWB wireless communication system of the present invention uses an optical FSK modulator described in any one of the above-mentioned (1) through (4) and a photodetector which can respond to a frequency component equal to or greater than twice the RF signal frequency inputted to the $RF_A$ electrode and the $RF_B$ electrode of the optical frequency shift keying modulator.

Namely, the UWB wireless communication system of the present invention uses the above-mentioned optical FSK modulator, and by using, for example, a high-frequency rectangular pulse having a rise time of 1%-10% as the signal applied to the $RF_C$ electrode, the millimeter-wave/microwave pulse is obtained. Also, since a photodetector which can respond to a frequency component equal to or greater than twice the RF signal frequency inputted to the $RF_A$ electrode and the $RF_B$ electrode of the optical FSK modulator is used, such a millimeter-wave/microwave can be effectively detected. Thus, a UWB wireless communication system can be achieved by the present invention.

According to the present invention, an optical FSK modulator which can be used for an optical information communication and the like can be provided.

According to the present invention, an optical FSK modulator which can be used for an optical information communication and the like and which can transmit information at a high speed can be provided.

According to the present invention, an optical FSK modulator which can be used for an optical information communication and the like and which is relatively space-saving can be provided.

According to the present invention, an optical FSK modulator which is used for an optical multiplex information communication including changes of an amplitude and frequency of an output light can be provided.

According to the present invention, an optical FSK modulator which can provide a new millimeter-wave source and microwave source can be provided.

According to the present invention, a new optical FSK communication method can be provided.

According to the present invention, an optical FSK communication system that is an optical communication system by an optical FSK can be provided.

According to the present invention, a multivalued modulation optical FSK communication system can be provided.

According to the present invention, an optical FSK and optical intensity modulation communication system that is an optical communication system by an optical FSK and optical intensity modulation can be provided.

According to the present invention, a method of generating a millimeter-wave/microwave using an optical FSK modulator can be provided.

According to the present invention, a UWB wireless communication system using an optical FSK modulator can be provided.

BRIEF DESCRIPTION OF THE DRAWINGS

FIG. 5 is a graph showing an example of an output spectrum of an optical FSK modulator.

FIG. 6 is an eye-diagram of an output signal in an optical FSK communication system.

FIGS. 7(a)-7(e) are diagrams illustrating output signals having five levels of values, wherein FIGS. 7(a), 7(b), 7(c), 7(d), and 7(e) respectively show cases where outputs of "1", "0.5", "0", "−0.5", and "−1" are provided.

FIG. 10(a) shows an output signal of a photodetector for detecting optical intensity, and FIG. 10(b) shows an output signal obtained by a subtracter.

FIGS. 11(a) and 11(b) are substitute graphs for diagrams showing waveform examples of output signals outputted by a millimeter-wave/microwave pulse generation method of the present invention, wherein FIG. 11(a) shows a UWB signal. (millimeter-wave/microwave pulse) and FIG. 11(b) shows a magnification thereof.

DETAILED DESCRIPTION OF THE PREFERRED EMBODIMENTS

1. Optical FSK Modulator

Figure 1:
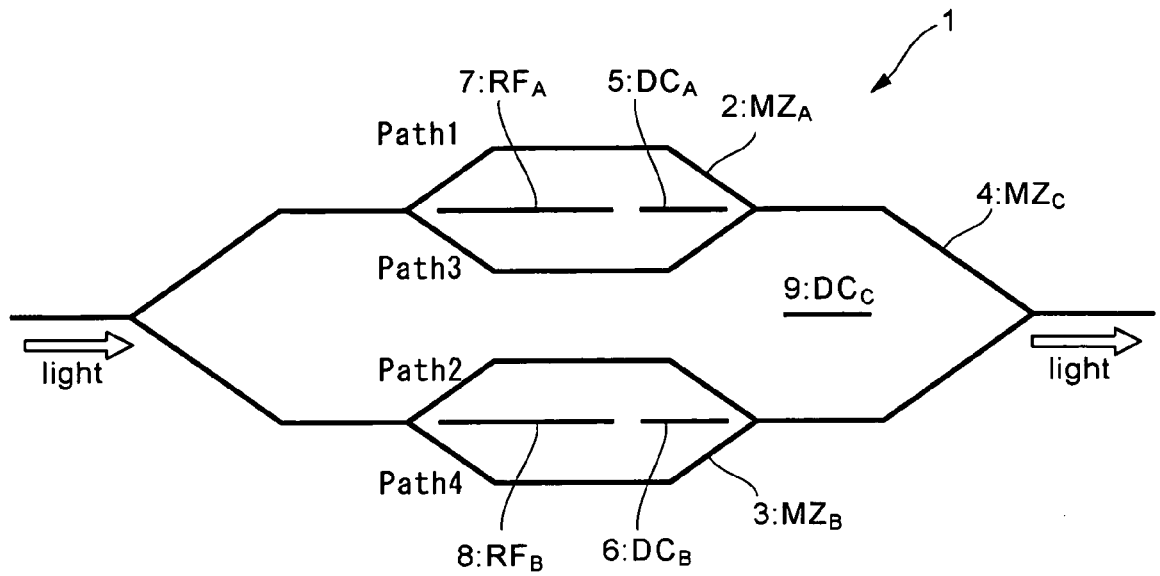
FIG. 1 is a block diagram showing a basic arrangement of an optical SSB modulator.
Figure 2:
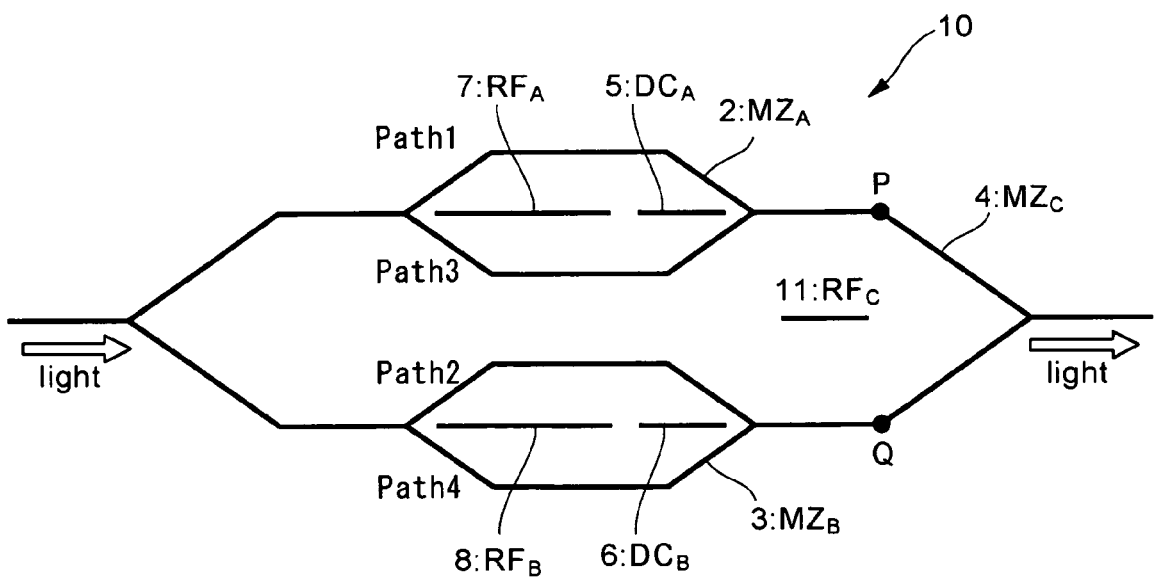
FIG. 2 is a block diagram showing a basic arrangement of an optical FSK modulator according to a first embodiment of the present invention.

Hereinafter, an optical FSK modulator 10 according to a first embodiment of the present invention will be described referring to the drawings. FIG. 2 is a block diagram showing a basic arrangement of such an optical FSK modulator. As shown in FIG. 2, the optical FSK modulator of the present invention is provided with: for example, a first sub Mach-Zehnder waveguide ($MZ_A$) 2; a second sub Mach-Zehnder waveguide ($MZ_B$) 3; a main Mach-Zehnder waveguide ($MZ_C$) 4 including the $MZ_A$ and $MZ_B$ and provided with a light input portion and a modulated light output portion; a first direct-current or low-frequency electrode ($DC_A$ electrode) 5 controlling a bias voltage between two arms composing the $MZ_A$, thereby controlling a phase of light propagating in the two arms of the $MZ_A$; a second direct-current or low-frequency electrode ($DC_B$ electrode) 6 controlling a bias voltage between two arms composing the $MZ_B$, thereby controlling a phase of light propagating in the two arms of the $MZ_B$; a first RF electrode ($RF_A$ electrode) 7 inputting a radio frequency (RF) signal to the two arms composing the $MZ_A$; a second RF electrode ($RF_B$ electrode) 8 inputting an RF signal to the two arms composing the $MZ_B$; and a traveling-wave-type electrode ($RF_C$ electrode) 11 controlling a frequency of the RF signal inputted, thereby controlling a frequency of light outputted from the output portion.

1.1. Mach-Zehnder waveguide Each of the Mach-Zehnder waveguides is composed so as to be provided with two phase modulators paralleled. The example of FIG. 2 includes the first sub Mach-Zehnder waveguide ($MZ_A$) 2, the second sub Mach-Zehnder waveguide ($MZ_B$) 3, and the main Mach-Zehnder waveguide ($MZ_C$) 4 including the $MZ_A$ and $MZ_B$, and provided with the light input portion and the modulated light output portion.

1.2. Substrate An electro-optic crystal such as lithium niobate, lithium tantalate, and lithium niobate-lithium tantalate solid solution is preferable as the material of the substrate, and an X-cut $LiNbO_3$ substrate is preferable in particular. A known formation method such as an internal diffusion method of a titanium diffusion method and the like or a proton exchange method can be used as an optical waveguide formation method. Namely, the optical FSK modulator of the present invention can be produced, for example, as follows: firstly, an optical waveguide is formed by patterning titanium on a lithium niobate wafer by a photolithographic method and by making the titanium diffused by a thermal diffusion method. Conditions in this case may be as follows: thickness of the titanium within 100-2000 angstroms, diffusion temperature within 500-2000° C., and diffusion time within 10-40 hours. An insulation buffer layer of silicon dioxide (thickness of 0.5-2 μm) is formed on the principal plane of the substrate. Subsequently, an electrode consisting of a metallic plating of thickness of 15-30 μm is formed thereon, and then the wafer is cut. Thus formed is an optical modulator on which a titanium diffused waveguide is formed.

1.3. Resonant-type Electrode

A resonant-type optical electrode (resonant-type optical modulator) is an electrode for performing a modulation using resonance of a modulating signal. A known resonant-type electrode, for example, one described in Japanese patent application laid-open No.2002-268025 can be adopted.

1.4. Traveling-wave-type electrode. A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "optical integrated circuit" (revised and updated edition), Ohmsha, pages 119-120). A known traveling-wave-type electrode such as those disclosed in Japanese patent application laid-open Nos.11-295674, 2002-169133, 2002-40381, 2000-267056, 2000-47159, and 10-133159, for example, can be adopted as the traveling-wave-type electrode.

A preferable traveling-wave-type electrode adopting a so-called symmetrical-type earth electrode arrangement (one provided with at least a pair of earth electrodes on both sides of a traveling-wave-type signal electrode) can be mentioned. Thus, by symmetrically arranging the earth electrodes sandwiching the signal electrode, a high frequency wave outputted from the signal electrode is made easy to be impressed to the earth electrodes arranged on the left and right of the signal electrode, thereby suppressing an emission of a high frequency wave to the side of the substrate.

2. Operation of optical FSK modulator. An operation of the optical FSK modulator will now be described. Sinusoidal RF signals with phases different from each other by 90° are inputted to four optical phase modulators paralleled. Also, bias voltages for the $DC_A$ electrode, $DC_B$ electrode, and $RF_C$ electrode are adjusted so that mutual phase differences are respectively 90° with respect to light. When this is done, light having a frequency shifted as much as the frequency of the RF signal is outputted. Directions of frequency shifting (decrease/increase) can be selected by setting the bias voltage. Namely, each of the phase modulators have respective phase difference of 90° for both of electricity and light. It is to be noted that when the X-cut substrate is used, by merely providing sinusoidal waves of 90° phase difference to the $RF_A$ electrode and $RF_B$ electrode for RF signals, modulation of the RF signal at phases 0°, 90°, 180°, and 270° are respectively realized by the four phase modulators (Higuma et al., X-cut lithium niobium optical SSB modulator, electron letter, vol. 37, 515-516 (2001)).

Figure 3:
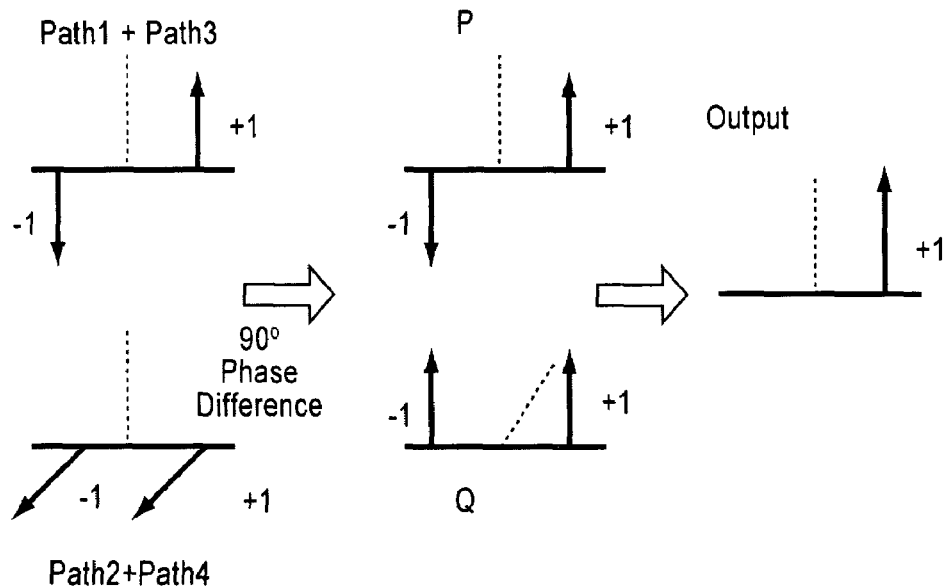
FIG. 3 is a schematic diagram showing an optical spectrum at each point of the optical FSK modulator of FIG. 2.

FIG. 3 is a schematic diagram showing an optical spectrum at each point of the optical FSK modulator. Arrows in the figure indicate light. In each of the MZ arrangement portions of FIG. 2, the bias voltages of the $DC_A$ electrode and the $DC_B$ electrode are adjusted (see left of FIG. 3) so that light phase difference between two paths (path 1 and path 3, path 2 and path 4) assume 180°. A bias voltage of the $RF_C$ electrode is adjusted so that light phase difference of the two MZ arrangement portions is 90°. At P point and Q point of FIG. 2, both of the sidebands appear respectively (FIG. 3 center). However, at the P point and Q point, the lower sideband phases are opposite. Accordingly, in the output light having coupled these lights include only the upper side wave component (FIG. 3 right).

On the other hand, when the bias voltage of the $RF_C$ electrode is adjusted so that the optical phase difference of the two MZ arrangement portions is 270°, only the lower side wave component is outputted. Therefore, by switching the signal voltage of the $RF_C$ electrode, the upper side wave component and the lower side wave component can be switched to be outputted.

In the present invention, a traveling-wave-type electrode corresponding to the RF frequency is used as the $RF_C$ electrode, so that the above-mentioned frequency shifting can be performed at a high-speed. Therefore, the present invention can provide an optical FSK modulator and an optical communication method using the optical FSK modulator.

Figure 4:
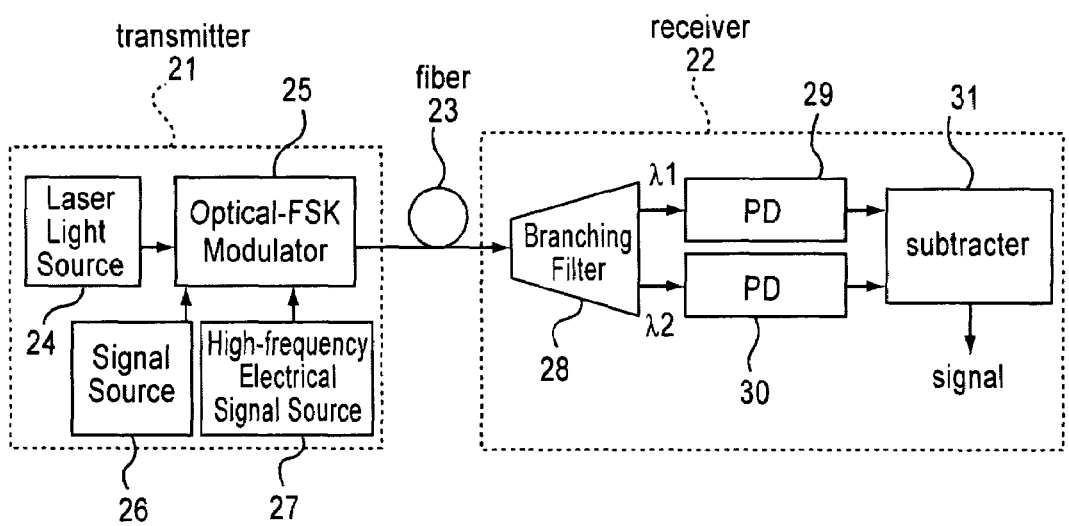
FIG. 4 is a block diagram showing a basic arrangement of an optical FSK communication system of the present invention.

3. Optical FSK communication system. An optical FSK communication system is a system for optical information communication using the optical frequency shift keying. The optical FSK communication system of the present invention will be described referring to drawings. FIG. 4 is a block diagram showing a basic arrangement of an optical FSK communication system of the present invention. As shown in FIG. 4, the optical FSK communication system of the present invention includes, in the same way as a regular optical communication system, a transmitter (21), a receiver (22), and a fiber (23) connecting the transmitter and the receiver.

3.1. Transmitter. As shown in FIG. 4, the transmitter (21) in the optical FSK communication system of the present invention is provided with a laser light source (24), an optical FSK modulator (25) to which light from the laser light source is inputted, a signal source (26) for outputting a signal to be transmitted to the optical FSK modulator, and a high-frequency electric signal source (27) for applying a high-frequency electric signal to the optical FSK modulator.

3.1.1. Laser light source. The laser light source (24) is a device for generating laser. In the conventional optical FSK system, a wavelength of the laser itself generated from the laser light source was changed. However, in the optical FSK modulator and the optical FSK communication system of the present invention, the optical modulator is used, thereby maintaining the output of the laser light source itself at a fixed value.

3.1.2. Optical FSK modulator. As the optical FSK modulator (25), the optical FSK modulator described above can be used.

3.1.3. Signal source. The signal source (26) is a device for outputting signal to be transmitted to the optical FSK modulator, for which a known signal source can be adopted. The signal source (FSK signal source) controls the signal to be transmitted to the $RF_C$ electrode of the optical FSK modulator. The use of a signal source which can set a plurality of voltage levels to be switched over is an aspect related to the optical FSK communication capable of providing multivalued modulation. As a signal to be inputted from the signal source to the $RF_C$ electrode, a signal having a frequency component of preferably between 500 MHz and 300 GHz both inclusive can be mentioned, which preferably assumes 500 MHz-10 GHz. It is to be noted that the frequency of the signal transmitted to the $RF_C$ electrode controlled by the signal source is preferably smaller compared to the frequencies of the signals transmitted to the $RF_A$ electrode and the $RF_B$ electrode controlled by the high-frequency electric signal source later described. This is because the apparatus becomes complicated if the frequency of the signal transmitted to the $RF_C$ electrode controlled by the signal source is larger compared to the frequencies of the signals transmitted to the $RF_A$ electrode and the $RF_B$ electrode controlled by the high-frequency electric signal source later described.

3.1.4. High-frequency electric signal source. The high-frequency electric signal source (27) is a device for providing a high-frequency electric signal to the optical FSK modulator, for which a known high-frequency electric signal source can be adopted. The high-frequency electric signal source mainly controls the signals to be transmitted to the $RF_A$ electrode and the $RF_B$ electrode. For example, 1 GHz-100 GHz can be mentioned as the high frequency. As an output of the high-frequency electric signal source, a sinusoidal wave having a fixed frequency can be mentioned.

3.2. Receiver.

As shown in FIG. 4, the receiver (22) in the optical FSK communication system of the present invention is provided with a branching filter (28) for branching the optical signal transmitted from the transmitter according to the wavelengths thereof, a first photodetector (29) for detecting one of the optical signals branched by the branching filter, a second photodetector (30) for detecting the remaining optical signal branched by the branching filter, and a subtracter (31) for calculating the difference between the output signals of the first and second photodetectors.

3.2.1. Branching filter. The branching filter (28) is a device for branching the optical signal transmitted from the transmitter according to the wavelengths thereof, for which a known branching filter can be adopted.

3.2.2. Photodetector. The photodetectors (29, 30) are devices for detecting optical signals branched by the branching filter, for which a known photodetector can be adopted. For example, a device including photodiode can be adopted as such photodetectors. As the photodetector, one which detects the optical signal to be converted into electric signal can be mentioned. Intensity or the like of the optical signal can be detected by the photodetector.

3.2.3. Subtracter. The subtracter (31) is a device including an arithmetic circuit and the like for calculating a difference between the output signals of the first and second photodetectors, for which a known subtracter can be adopted.

4. Operation of optical FSK communication system. Hereinafter, an operation example of the optical FSK communication system will be described. The light from the laser light source is inputted to the optical FSK modulator (25). In the optical FSK modulator, a predetermined signal is applied to the $RF_C$ electrode by the signal source (26), and predetermined signals are applied to the $RF_A$ electrode and the $RF_B$ electrode from the high-frequency electric signal source (27). Thus, the predetermined signal is transmitted from the transmitter.

FIG. 5 is a graph showing an example of an output spectrum from the optical FSK modulator. In this example, the laser light is made 193 THz, 0 dBm, the signal from the signal source is made an NRZ signal of 2.5 Gbps, the signal from the high-frequency electric signal source is made a signal of 10 GHz, and the phase shifting amount in the optical FSK modulator is made 105°.

An output composed of mainly the two frequency components as shown in FIG. 5 passes through an optical fiber such as single-mode fiber and reaches the receiver.

In the receiver (22), the branching filter (28) branches the optical signal transmitted from the transmitter according to the wavelengths thereof. The first photodetector (29) detects one of the optical signals branched by the branching filter. The second photodetector (30) detects the remaining optical signal branched by the branching filter. The subtracter (31) calculates the difference between the output signals of the first and second photodetectors. Subsequently, the signal obtained by the subtracter is outputted to a monitor and the like not shown.

FIG. 6 is an eye-diagram of the output signal thus outputted. In this example, the transmitter as described above is used, a single-mode fiber of 50 km is used as the optical fiber, and the optical signal is amplified by an optical amplifier of 10 dBm fixed output mode after being transmitted through the optical fiber, and the output of the photodetector is smoothed by the Bessel filter having 2.5 G×0.75 Hz cutoff frequency. It is seen from FIG. 6 that a good eye opening is obtained, so that the optical FSK communication system of the present invention can perform a digital signal transmission.

5. Operation of Multivalued Modulation Optical FSK Communication System.

The multivalued modulation FSK communication system can be achieved by making the signal source set a plurality of voltage levels to be switched over in the above-mentioned operation of the optical FSK communication system. In the optical FSK communication system described above, the output signal was either "1" or "−1". However, in the multivalued modulation optical FSK communication, intensities of light having two kinds of wavelengths outputted from the optical FSK modulator can be adjusted, so that output signals of a plurality of levels can be obtained.

FIGS. 7(a)-7(e) are diagrams for describing the signal outputs having five levels of values. It is to be noted that in FIGS. 7(a)-7(e), the output from the optical FSK modulator is made λ1, and λ2. Namely, in the subtracter, the output signal derived from λ2 is subtracted from the output signal derived from λ1. In the examples shown in FIGS. 7(a)-7(e), five levels of output including "1", "0.5", "0", "−0.5", and "−1" can be obtained.

Figure 8:
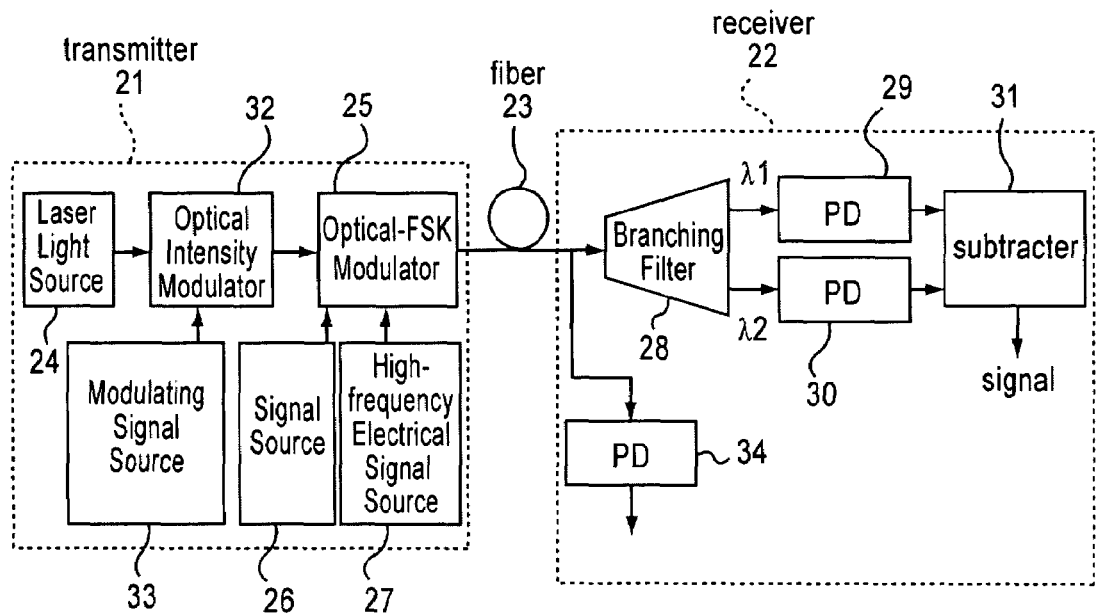
FIG. 8 is a schematic diagram showing a basic arrangement of an optical FSK and optical intensity modulation communication system of the present invention.

6. Optical FSK and optical intensity modulation communication system. The optical FSK and optical intensity modulation communication system of the present invention will be described referring to the drawings. FIG. 8 is a schematic diagram showing the basic arrangement of the optical FSK and optical intensity modulation communication system of the present invention. As shown in FIG. 8, the optical FSK and optical intensity modulation communication system of the present invention includes, as in the regular optical communication system, the transmitter (21), the receiver (22), and the fiber (23) connecting the transmitter and the receiver.

6.1. Transmitter. As shown in FIG. 8, the transmitter (21) is provided with the laser light source (24), the optical intensity modulator (32) for modulating the intensity of light from the laser light source, and the optical FSK modulator (25) to which the light from the laser light source whose intensity is modulated by the optical intensity modulator is inputted, the intensity modulating signal source (33) for outputting a signal to be transmitted to the optical intensity modulator, the signal source (FSK signal source: 26) for outputting a signal to be transmitted to the optical FSK modulator, and the high-frequency electric signal source (27) for providing a high-frequency electric signal to the optical FSK modulator. Among the components of the transmitter, those that have been described above in the description of the optical FSK communication system, the same components can be used in the same way.

Despite particularly illustrated in the figures, the transmitter (21) comprises with the laser light source (24), the optical FSK modulator (25) to which the light from the laser light source is inputted, the optical intensity modulator (32) for modulating the intensity of light from the laser light source having its frequency modulated by the optical FSK modulator, the intensity modulating signal source (33) for outputting a signal to be transmitted to the optical intensity modulator, the signal source (FSK signal source: 26) for outputting a signal to be transmitted to the optical FSK modulator, and the high-frequency electric signal source (27) for providing a high-frequency electric signal to the optical FSK modulator, it is a different aspect of the optical FSK and the optical intensity modulation communication system of the present invention described above.

6.1.1. Optical intensity modulator. The optical intensity modulator (32) is a device for modulating the intensity of light from the laser light source, for which a known optical intensity modulator can be adopted. It is to be noted that the optical intensity modulator may directly modulate the intensity of the output light from the laser light source or modulate the intensity of the output light from the optical FSK modulator.

6.1.2. Intensity modulation signal source. The intensity modulation signal source is a device for outputting a signal to be transmitted to the optical intensity modulator, for which a known intensity modulation signal source can be adopted.

6.2. Receiver. As shown in FIG. 8, the receiver (22) in the optical FSK and optical intensity modulation communication system of the present invention is provided with the intensity measurement photodetector (34) for measuring the intensity of the optical signal transmitted from the transmitter, the branching filter (28) for branching the optical signal transmitted from the transmitter according to the wavelengths thereof, the first photodetector (29) for detecting one of the optical signals branched by the branching filter, the second photodetector (30) for detecting the remaining optical signal branched by the branching filter, and the subtracter (31) for calculating a difference between the output signals of the first and second photodetectors. Among the components of the receiver for those that have been described above in the description of the optical FSK communication system, the same components can be used in the same way.

6.2.1. Intensity Measurement Photodetector.

The intensity measurement photodetector (34) is a device for measuring intensity of the optical signal transmitted from the transmitter, for which a known photodetector can be adopted.

7. Operation of optical FSK and optical intensity modulation communication system. The operation of the optical FSK and optical intensity modulation communication system of the present invention is basically the same as that of the optical FSK communication system described above. In the optical FSK and optical intensity modulation communication system of the present invention, the intensity of light from the laser light source is modulated and the intensity of the optical signal is measured before the optical signal transmitted from the transmitter is branched.

Figure 9:
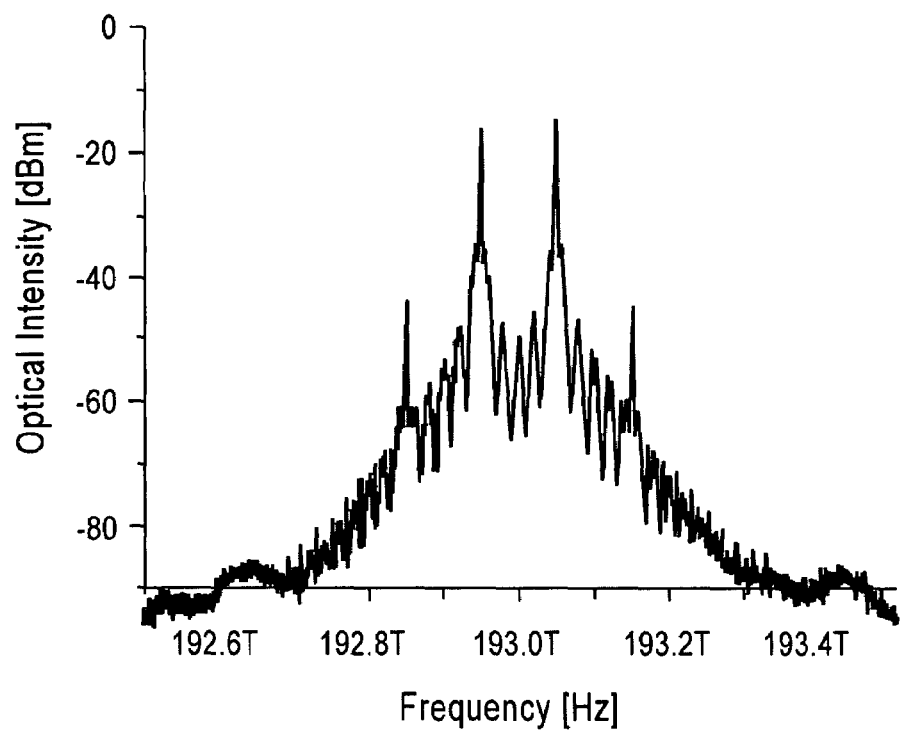
FIG. 9 is a graph showing an example of an output spectrum from an optical FSK modulator in an optical FSK and optical intensity modulation communication system.

FIG. 9 is a graph showing an example of output spectrum of the optical FSK modulator in the optical FSK and optical intensity modulation communication system. In this example, the laser light assumes 193 THz and 0 dBm, an extinction ratio in the optical intensity modulator assumes 10 dB, the signal from the FSK signal source assumes an NRZ signal of 20 Gbps, the signal from the high-frequency electric signal source assumes a signal of 50 GHz, and the phase shift amount in the optical FSK modulator assumes 105°.

The output consisting of mainly two frequency components as shown in FIG. 9 reaches the receiver through an optical fiber such as a single-mode fiber.

In the receiver (22), the photodetector (34) for detecting optical intensity detects the intensity of the optical signal. The branching filter (28) branches the optical signal transmitted from the transmitter according to the wavelengths thereof. The first photodetector (29) detects one of the signals branched by the branching filter. The second photodetector (30) detects the remaining optical signal branched by the branching filter. The subtracter (31) calculates the difference between the output signals of the first and second photodetectors. Thereafter, the signal obtained by the subtracter is outputted to a monitor or the like not shown.

Figure 10A:
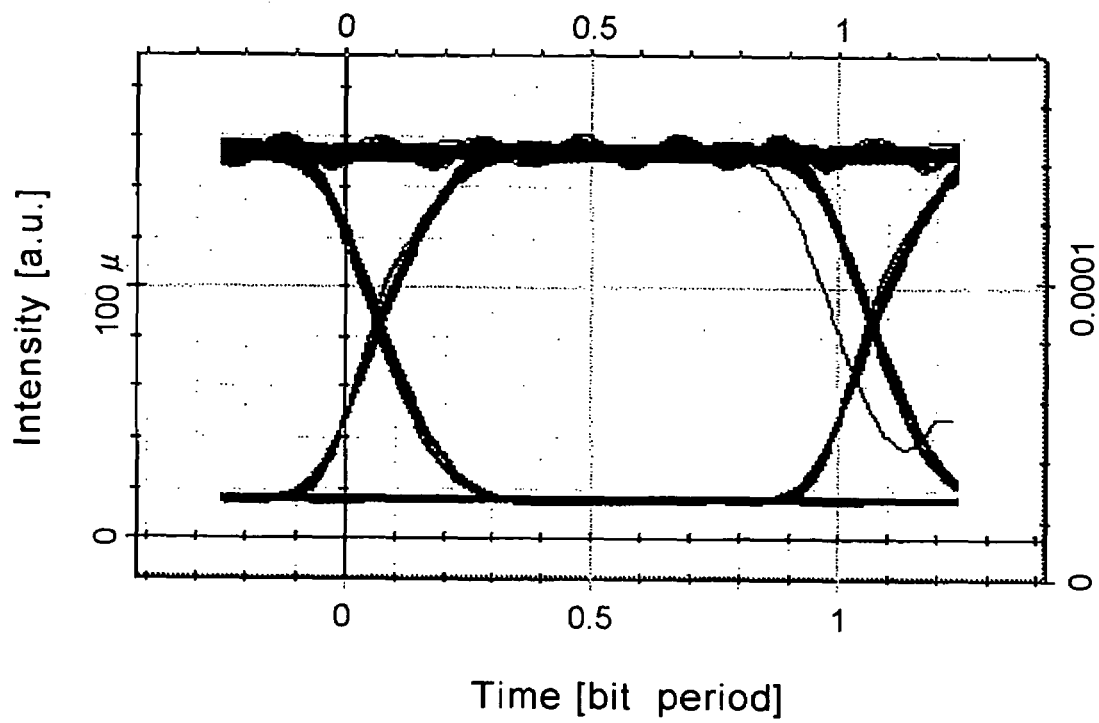
FIGS. 10(a) and 10(b) are eye-diagrams of output signals in an optical FSK and optical intensity modulation communication system.
Figure 10B:
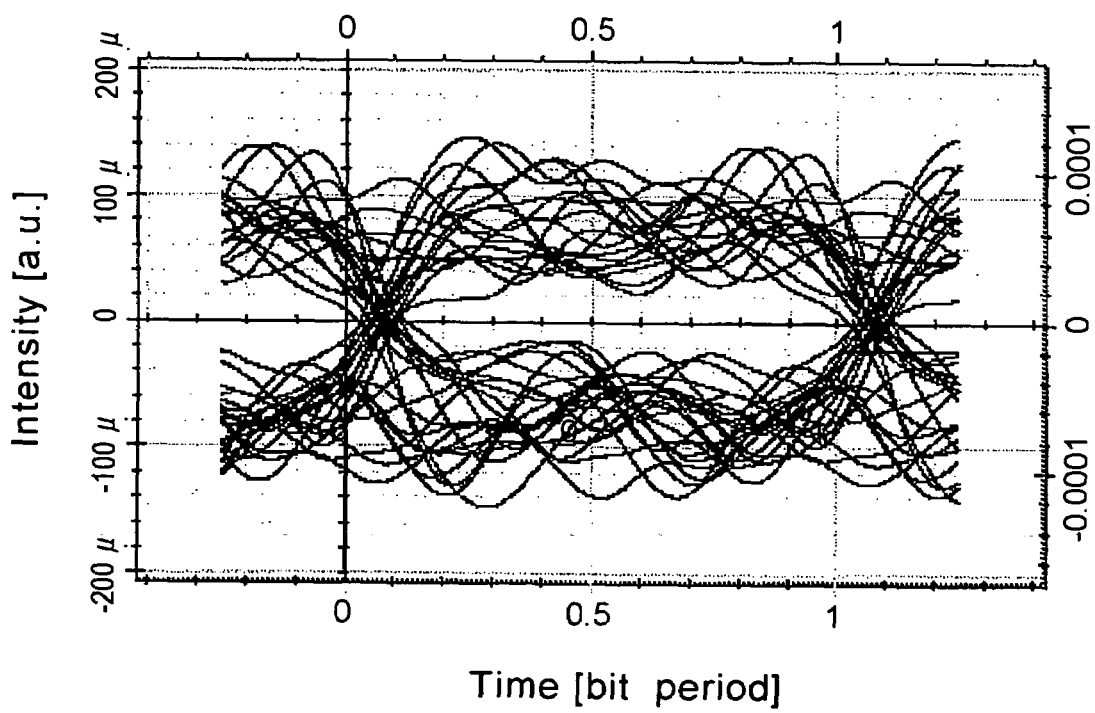

FIGS. 10(a) and 10(b) are eye-diagrams of the output signals thus outputted. FIG. 10(a) shows the output signal of the photodetector for detecting optical intensity, while FIG. 10(b) shows the output signal obtained by the subtracter. In this example, the above-mentioned transmitter is used, and a single-mode fiber of 50 km is used as the optical fiber, so that following the transmission through the optical fiber, the output of the photodetector for detecting optical intensity is smoothed by a Bessel filter of a cutoff frequency of 30 GHz, and the output obtained by the subtracter is smoothed by a Bessel filter of a cutoff frequency of 2 GHz. From FIG. 10(a), it is seen that a good eye opening is obtained by the output of the photodetector for detecting optical intensity, so that a digital signal transmission is made possible. From FIG. 10(b), it is seen that although divergence is increased on a zero level and a mark level due to the influence of the intensity modulation for the output obtained by the subtracter, an eye opening is retained. As seen from the foregoing, the optical FSK and optical intensity modulation communication system of the present invention can simultaneously transmit the intensity modulated signal and the FSK signal.

8. Millimeter-wave/Microwave Pulse Generation Method.

Hereinafter, a millimeter-wave/microwave pulse generation method of the present invention will be described. The millimeter-wave/microwave generation method of the present invention uses an optical FSK modulator and a photodetector which can respond to the frequency components equal to or greater than twice the RF signal frequency inputted to the $RF_A$ electrode and the $RF_B$ electrode of the optical FSK modulator. As such a photodetector, a "uni-traveling-carrier photodiode" (Tadao Ishibashi, Hiroshi Ito, "Uni-traveling-carrier photodiodes", application physics, Vol. 70, No. 11, p. 1304-1307 (2001)) or the like can be mentioned.

The millimeter-wave/microwave pulse generation method of the present invention uses a phenomenon that two components of an upper sideband and a lower sideband are simultaneously and transiently generated upon shifting an optical frequency in an optical FSK modulator. When the output light of the modulator is guided to a photodetector which can respond to a frequency component equal to or greater than the frequency difference between these two components (two times the RF signal frequency inputted to the $RF_A$ electrode and the $RF_B$ electrode), an RF signal having a frequency corresponding to the frequency difference is generated only when the two components are simultaneously generated. Since this is a transient phenomenon at the time of the frequency switching, when the signal ($RF_C$) for the optical frequency switching is made a rectangular pulse with short rise/fall times, it is made possible to generate an RF signal for only an extremely short time.

Namely, the millimeter-wave/microwave pulse generation method of the present invention uses the above-mentioned optical FSK modulator, and by using, for example, a high-frequency rectangular pulse having a rise time of 1%-10% as the signal applied to the $RF_C$ electrode, the millimeter-wave/microwave pulse is obtained. Also, by using the millimeter-wave/microwave pulse thus obtained, a UWB signal can be obtained, so that it is possible to obtain a UWB wireless communication system. For example, when a rectangular pulse with a rise time of 0.05 nanosecond is inputted to the $RF_C$, and the RF signal frequency to be inputted to the $RF_A$ electrode and the $RF_B$ electrode is made 25 GHz, a 50 GHz RF signal (UWB signal) with a pulse width of 0.1 nanosecond is obtained.

The UWB wireless communication system is the wireless system using a pulse (impulse wave) of an extremely narrow width of 1 nanosecond or less, and uses an extremely wide bandwidth of frequency width (several GHz-several tens of GHz), which is the system used for communication and a remote sensing. By using this system, communication of a higher data transmission rate can be achieved by lesser power consumption compared to the conventional system. The bandwidth of the UWB wireless communication system is equal to or wider than one thousand times that of the existing wideband CDMA (wide-band CDMA) an the like. A bandwidth having a relative bandwidth=(bandwidth)/(center frequency) equal to or greater than 25% is usually called a UWB.

The UWB wireless communication system has a feature that the power spectral density is extremely low (noise level, below DS-SS (direct sequence spread spectrum). Also, the UWB wireless communication system has a feature that there is little interference to/from the existing communication system, so that coexistence is possible. The UWB wireless communication system has a feature that transmission of several kilometers is made possible with average power level of 1 mW or less. Also, since the UWB wireless communication system uses an extremely short pulse (on the nanosecond time scale), it has a feature of being strongly efficient in multi-path by a RAKE reception (namely, having a high efficiency of path separation). Also, when used as a radar, it has a feature of being capable of performing a highly precise ranging (of the order of several cm), or having a high axial resolution. Since the UWB wireless communication system has no carrier and the signal transmission time is very short, it has a feature that a system of a small size and a low power consumption can be constructed. The UWB wireless communication system can always occupy a wide band (of the order of e.g. GHz), so that a large-volume multiple access and super-high-speed transmission (<hundreds of Mbps) is made possible. Since the UWB wireless communication system can simultaneously perform communication and ranging, it can be applied to an ITS (such as inter-vehicle communication).

A carrier frequency of a UWB signal becomes twice the frequency of the high-frequency electric signal source, so that a signal with high frequency components can be generated, and that the frequency can be controlled easily. The pulse shape of a UWB signal is determined by the $RF_C$ signal waveform, so that the pulse shape of the UWB signal can be control easily by adjusting, for example, the rise time or the like.

Figure 11A:
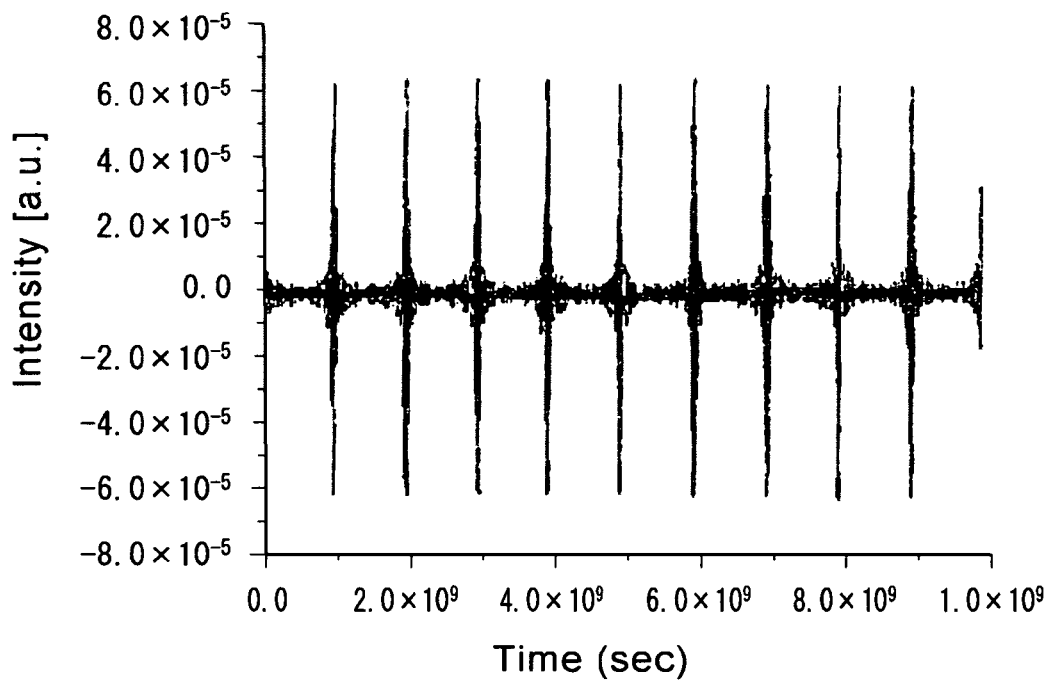
Figure 11B:
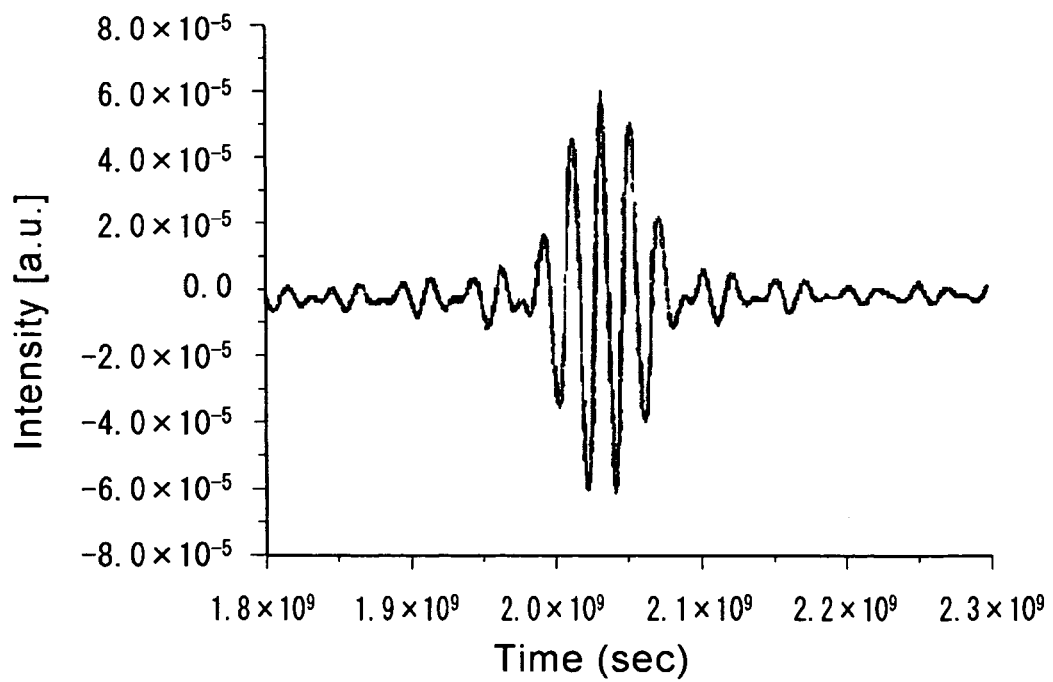

FIGS. 11(a) and 11(b) are substitute graphs for drawings showing waveform examples of the output signal outputted by the millimeter-wave/microwave pulse generation method of the present invention. FIG. 11(a) shows a UWB signal (millimeter-wave/microwave pulse), while FIG. 11(b) shows a magnification thereof. In this example, the transmitter (FIG. 4; 21) of the above-mentioned optical FSK communication system is used and the signal from the signal source assumes a 1 GHz repetitive rectangular pulse with a rise time of 5%, the signal from the high frequency electric signal source assumes a 25 GHz signal which is detected using the high-speed photodetector. It is to be noted that when a light phase shift by the $RF_C$ assumes P, an envelope of the photodetector output is expressed by COS(P/2)SIN(P/2). When P=0°, only λ1 is outputted, and when P=180°, only λ2 is outputted. In a transient state, 0°<P<180° is satisfied and the RF signal is generated from the photodetector. It is seen from FIGS. 11(a) and 11(b) that the UWB signal can be obtained by using the optical FSK modulator of the present invention.

The optical FSK modulator of the present invention can obtain a signal of a good S/N ratio without changing the intensity of light, so that it can be suitably used for an optical communication system.

The optical FSK modulator of the present invention can modulate the phase of the light at a high-speed, so that it can be used for a high-speed optical information communication.

The optical FSK modulator of the present invention can provide a phase modulation to a label portion of an optical packet, so that it can be suitably used for an optical communication system in combination with an intensity modulation technology.

The optical FSK modulator of the present invention can control the amplitude of the output light by controlling the intensity of the RF signal inputted from the $RF_A$ electrode and the $RF_B$ electrode. Therefore, in combination with the frequency control of the output light by the $RF_C$ electrode, the optical FSK modulator of the present invention can be suitably used for an optical communication system provided with an optical frequency modulation and optical amplitude modulation.

The optical FSK modulator of the present invention is a new device for preparing an RF pulse, so that it can be suitably used as a new millimeter-wave source and the like for transmission in a millimeter wave range.

The optical FSK communication system of the present invention can be used as an optical communication system.

The multivalued modulation optical FSK communication system of the present invention can be used as an optical communication system.

The optical FSK and optical intensity modulation communication system of the present invention can be used as an optical communication system.

The millimeter-wave/microwave generation method of the present invention can be used as a new millimeter-wave/microwave generation method for an optical communication system or the like.

The UWB wireless communication system of the present invention can be used in various fields of information and communication such as an ITS.

What is claimed is:

1. An optical frequency shift keying modulator comprising:
   a first sub Mach-Zehnder waveguide $MZ_A$;
   a second sub Mach-Zehnder waveguide $MZ_B$;
   a main Mach-Zehnder waveguide $MZ_C$ including said $MZ_A$ and said $MZ_B$, and including a light input portion and a modulated light output portion;
   a first RF electrode, $RF_A$ electrode, inputting a radio frequency RF signal to two arms composing said $MZ_A$;
   a second RF electrode, $RF_B$ electrode, inputting the RF signal to two arms composing said $MZ_B$; and
   a third RF electrode, $RF_C$ electrode, of a traveling-wave-type electrode for high speed optical phase switch at the junction of the pair of sub Mach-Zehnder waveguides $MZ_A$ and said $MZ_B$ by adjusting the bias voltage of the $RF_C$ electrode, thereby controlling a frequency of the light outputted from said output portion;
   wherein the voltage of the RF signal inputted to the $RF_C$ electrode of the traveling-wave-type electrode corresponding to the RF signal is controlled, so that the frequency of the light outputted from the output portion is modulated, wherein the signal inputted to said $RF_C$ electrode has a frequency component greater than 500 MHz.

2. The optical frequency shift keying modulator as claimed in claim 1, wherein a resonant-type electrode is used as the $RF_A$ electrode and the $RF_B$ electrode.

3. The optical frequency shift keying modulator as claimed in claim 1, further comprising:
   a first direct-current or low-frequency electrode, $DC_A$ electrode, controlling a bias voltage between the two arms composing said $MZ_A$, thereby controlling a phase of light propagating in the two arms of said $MZ_A$; and
   a second direct-current or low-frequency electrode, $DC_B$ electrode, controlling a bias voltage between the two arms composing said $MZ_B$, thereby controlling a phase of light propagating in the two arms of said $MZ_B$.

4. The optical frequency shift keying modulator as claimed in claim 1, further comprising a third direct-current or low-frequency electrode, $DC_C$ electrode, controlling a bias voltage between two arms composing said $MZ_C$, thereby controlling a phase of light propagating in the two arms of said $MZ_C$.

5. An optical information communication method using an optical frequency shift keying modulator according to claim 1, comprising the steps of:
   a light leading step of leading light into said light input portion;
   an RF signal inputting step of inputting the RF signal to said $RF_A$ electrode and said $RF_B$ electrode; and
   an output light frequency shift keying step of controlling a voltage of the signal inputted to said $RF_C$ electrode, thereby controlling the frequency of the light outputted from said output portion.

6. The optical information communication method as claimed in claim 5, wherein an intensity of the RF signal inputted to at least one of the $RF_A$ electrode and the $RF_B$ electrode is controlled, so that an amplitude of the output light is modulated and the modulated amplitude is communicated as information.

7. An optical communication system comprising a transmitter, a receiver, and a fiber connecting the transmitter and the receiver;
   said transmitter comprises a laser light source, an optical frequency shift keying modulator according to claim 1, to which light from said laser light source is inputted, a signal source outputting a signal to be transmitted to said optical frequency shift keying modulator, and a high-frequency electric signal source providing a high frequency electric signal to said optical frequency shift keying modulator; and
   said receiver comprises
   a branching filter branching a light signal transmitted from said transmitter according to a wavelength thereof,
   a first photodetector detecting one of the light signal branched by said branching filter,
   a second photodetector detecting the remaining light signal branched by said branching filter, and
   a subtracter calculating a difference between output signals of said first and second photodetectors.

8. The optical communication system as claimed in claim 7, wherein said signal source can set a plurality of voltage levels to be switched over.

9. An optical communication system comprising a transmitter, a receiver, and a fiber connecting the transmitter and the receiver;

said transmitter comprises a laser light source, an optical intensity modulator modulating intensity of light from said laser light source, an optical frequency shift keying modulator as in one of claims 1-4, in which the light from said laser light source having the intensity thereof modulated by said optical intensity modulator is inputted, an intensity modulating signal source outputting a signal to be transmitted to said optical intensity modulator, a signal source outputting a signal to be transmitted to said optical frequency shift keying modulator, and a high-frequency electric signal source providing a high frequency electric signal to said optical frequency shift keying modulator; and said receiver comprises an intensity measurement photodetector measuring intensity of an optical signal transmitted from said transmitter, a branching filter branching a light signal transmitted from said transmitter according to a wavelength thereof, a first photodetector detecting one of the light signal branched by said branching filter, a second photodetector detecting the remaining light signal branched by said branching filter, and a subtracter calculating a difference between output signals of said first and second photodetectors.

10. An optical communication system comprising a transmitter, a receiver, and a fiber connecting the transmitter and the receiver;

said transmitter comprises a laser light source, an optical frequency shift keying modulator as in any one of claims 1-4, in which light from said laser light source is inputted, an optical intensity modulator modulating intensity of the light from said laser light source having a frequency thereof modulated by said optical frequency shift keying modulator is inputted, an intensity modulating signal source outputting a signal to be transmitted to said optical intensity modulator, a signal source outputting a signal to be transmitted to said optical frequency shift keying modulator, and a high-frequency electric signal source providing a high frequency electric signal to said optical frequency shift keying modulator; and said receiver comprises an intensity measurement photodetector measuring intensity of an optical signal transmitted from said transmitter, a branching filter branching a light signal transmitted from said transmitter according to a wavelength thereof, a first photodetector detecting one of the light signal branched by said branching filter, a second photodetector detecting the remaining light signal branched by said branching filter, and a subtracter calculating a difference between output signals of said first and second photodetectors.

11. A millimeter-wave/microwave pulse generation method using an optical frequency shift keying modulator according to claim 1 and a photodetector which can respond to a frequency component equal to or greater than twice the RF signal frequency inputted to the $RF_A$ electrode and the $RF_B$ electrode of said optical frequency shift keying modulator.

12. A UWB wireless communication system using an optical frequency shift keying modulator claimed as in one of claims 1-4 and a photodetector which can respond to a frequency component equal to or greater than twice the RF signal frequency inputted to the $RF_A$ electrode and the $RF_B$ electrode of said optical frequency shift keying modulator.

* * * * *